United States Patent
Reckziegel

(10) Patent No.: US 12,359,031 B2
(45) Date of Patent: Jul. 15, 2025

(54) ACRYLONITRILE-BASED CATION EXCHANGERS

(71) Applicant: LANXESS Deutschland GmbH, Cologne (DE)

(72) Inventor: Aurelia Reckziegel, Dormagen (DE)

( * ) Notice: Subject to any disclaimer, the term of this patent is extended or adjusted under 35 U.S.C. 154(b) by 632 days.

(21) Appl. No.: 17/573,682

(22) Filed: Jan. 12, 2022

(65) Prior Publication Data

US 2022/0220266 A1    Jul. 14, 2022

(30) Foreign Application Priority Data

Jan. 13, 2021 (EP) .................................... 21151268

(51) Int. Cl.
| | |
|---|---|
| C08J 5/22 | (2006.01) |
| C02F 1/42 | (2023.01) |
| C08F 8/12 | (2006.01) |
| C08F 220/70 | (2006.01) |

(52) U.S. Cl.
CPC ............ C08J 5/2231 (2013.01); C02F 1/42 (2013.01); C08F 8/12 (2013.01); C08F 220/70 (2013.01); C02F 2001/425 (2013.01)

(58) Field of Classification Search
CPC .......... C08F 8/12; C08F 220/70; C08J 5/2231
USPC ......................................... 521/31; 525/329.3
See application file for complete search history.

(56) References Cited

U.S. PATENT DOCUMENTS

| | | | | |
|---|---|---|---|---|
| 3,544,488 A | * | 12/1970 | Corte ....................... | C08F 8/00 |
| | | | | 526/329 |
| 5,175,193 A | * | 12/1992 | Heller ..................... | B01J 39/20 |
| | | | | 525/329.2 |
| 6,696,503 B2 | | 2/2004 | Happ et al. | |
| 2013/0134099 A1 | | 5/2013 | Zarges et al. | |

FOREIGN PATENT DOCUMENTS

| | | |
|---|---|---|
| CN | 86101585 A | 9/1987 |
| CN | 1082945 A | 3/1994 |
| CN | 103951780 A | 7/2014 |
| CN | 103964405 A | 8/2014 |
| DE | 102007009073 A | 8/2008 |
| JP | 60055002 A2 | 3/1985 |
| JP | 1156303 A2 | 6/1989 |
| JP | 2002330394 A2 | 12/2002 |
| JP | 2009155785 A2 | 7/2009 |

OTHER PUBLICATIONS

European Search Report from corresponding European Application No. EP21151268, dated Jun. 22, 2021, three pages.
Tingbao Qian et al: "Studies on the Synthesis and Pore Properties of Macroporous Polyacrylonitrile Resin Crosslinked by Triallyl Isocyanurate" Ion Exchange and Adsorption Bd. 1. Nr. 4. 1. Jan. 1988 (Jan. 1, 1988). Seiten 407-412. XP055813594.
Ezhova N M et al: 11 Porous biosorbents on the basis of methacrylic acid and triallylisocyanurate11 • Russian Chemical Bulletin International Edition Seriya Khimicheskaya. Springer Science+Business Media. Inc. Bd. 58. Nr. 8. 6. Jun. 2010 (Jun. 6, 2010). Seiten 1736-1740. XP019829682.

* cited by examiner

*Primary Examiner* — Fred M Teskin
(74) *Attorney, Agent, or Firm* — Nicanor A. Kohncke; Christopher L. McDavid; Ewa M. Wozniak

(57) ABSTRACT

The invention relates to acrylonitrile-based cation exchangers, to a process for the production thereof and to the use thereof for decationization and/or softening of aqueous or organic solutions.

14 Claims, No Drawings

ACRYLONITRILE-BASED CATION EXCHANGERS

BRIEF SUMMARY OF THE INVENTION

The invention relates to acrylonitrile-based cation exchangers, to a process for the production thereof and to the use thereof for decationization and/or softening of aqueous or organic solutions.

BACKGROUND OF THE INVENTION

Weakly acidic cation exchangers composed of polyacrylates have been known for decades. For example, weakly acidic cation exchangers based on acrylonitrile as monomer and divinylbenzene and diethylene diglycol divinyl ether as crosslinker mixture are known from EP-A 1110608. The cation exchangers of EP-A 1110608 have a particularly homogeneous network structure.

Weakly acidic, macroporous cation exchangers with mixed monomers such as in particular acrylic acid and methyl acrylate and crosslinker mixtures of divinylbenzene and triallyl isocyanurate are known from CN-A 103951780. These weakly acidic cation exchangers are said to exhibit good thermal stability and a high whiteness.

CN-A 103964405 describes weakly acidic, macroporous cation exchangers composed of mixtures of methyl acrylate, acrylonitrile, vinyl phenol and triallyl isocyanurate. The cation exchangers of CN-A 103964405 are said to have a high exchange capacity and a particularly white colour.

Similar ion exchangers composed of methyl acrylate and acrylonitrile as monomers and triallyl isocyanurate and divinylbenzene as crosslinker mixtures are known from CN-A 109485786. The use of a crosslinker mixture is said to result in more uniform crosslinking.

CN-A 86101585 discloses acrylic acid-based weakly acidic cation exchangers produced using a crosslinker mixture of triallyl cyanurate and divinylbenzene. The cation exchangers are said to exhibit good mechanical strength, no clumping and no stickiness.

CN-A 1082945 discloses weakly acidic, macroporous cation exchangers based on acrylonitrile. CN'945 recommends using crosslinker mixtures for the copolymerization of the acrylonitrile and these may also contain inter alia divinylbenzene and triallyl isocyanurate. The cation exchangers produced according to CN'945 are said to feature a good exchange capacity.

The cation exchangers known from the prior art further have the disadvantage that the water purified by the cation exchangers could be improved in terms of taste and smell.

Surprisingly, a cation exchanger has now been produced which makes it possible to overcome the disadvantages of the prior art and which allows production of water which is exceptional in terms of taste and smell.

BRIEF SUMMARY OF THE INVENTION

The present invention accordingly provides a cation exchanger which is produced by hydrolysis of a polymer produced based on 80% to 95% by weight of acrylonitrile as monomer and 5% to 20% by weight of triallyl isocyanurate as crosslinker, wherein the parts by weight of acrylonitrile and triallyl isocyanurate sum to at least 98% by weight based on the total amount of employed monomers and crosslinkers.

It is preferable when production of the polymer comprises employing acrylonitrile in an amount of 91% to 93% by weight and triallyl isocyanurate in an amount of 7% to 9% by weight, wherein the parts by weight of acrylonitrile and triallyl isocyanurate sum to at least 98% by weight based on the total amount of the employed monomers and crosslinkers.

It is particularly preferable when the parts by weight of acrylonitrile and triallyl isocyanurate sum preferably to at least 99% by weight, very particularly preferably 100% by weight, based on the total amount of employed monomers and crosslinkers.

The cation exchanger preferably has a gel-like structure and has a BET surface area <25 $m^2/g$.

Also provided is a process for producing a cation exchanger, comprising polymerizing, in the presence of water and at least one initiator, 80% to 95% by weight of acrylonitrile as monomer and 5% to 20% by weight of triallyl isocyanurate as crosslinker, wherein the parts by weight of acrylonitrile and triallyl isocyanurate sum to at least 98% by weight based on the total amount of the employed monomers and crosslinkers, thereby forming a polymer and hydrolyzing the polymer to afford the cation exchanger in the presence of at least one base or at least one acid.

In certain embodiments, the at least one initiator is selected from peroxy compounds, dibenzoyl peroxide, dilauroyl peroxide, bis(p-chlorobenzoyl) peroxide, dicyclohexyl peroxydicarbonate, tert-butyl peroctoate, tert-butyl peroxy-2-ethylhexanoate 2,5-bis(2-ethythexanoylperoxy)-2, 5-dimethylhexane, tert-amylperoxy-2-ethylhexane, azo compounds, 2,2'-azobis(isobutyronitrile), and 2,2'-azobis(2-methylisobutyronitrile).

The process is optionally in the presence of at least one protective colloid. In some embodiments, the protective colloid is employed and is selected from gelatine, starch, polyvinyl alcohol, polyvinylpyrrolidone, polyacrylic acid, polymethacrylic acid and copolymers of (meth)acrylic acid and (meth)acrylic acid esters, cellulose derivatives, cellulose, esters, cellulose ethers, carboxymethylcellulose, methylhydroxyethylcellulose, methylhydroxypropylcellulose, hydroxyethylcellulose, naphthalenesulfonic acid-formaldehyde condensate and the Na salt thereof.

In certain embodiments, the pH of the aqueous phase is adjusted to 8 to 10 by addition of a base.

In some embodiments, the weight ratio of acrylonitrile and triallyl isocyanurate to the aqueous phase is 0.5 to 1.0.

In certain embodiments, an acid hydrolysis is performed by addition of sulfuric acid. In some of those embodiments, acids are employed in a molar ratio of 0.5:1 to 5:1 based on the molar amount of nitrile groups in the polymer.

The cation exchangers described herein can be used in processes for decationization and/or softening of aqueous or organic solutions, for decationization and/or softening of process streams in the chemical industry and for removal of heavy metal and/or noble metal ions from aqueous solutions, by contacting the cation exchanger with the aqueous or organic solutions and/or the process streams in the chemical industry to be treated.

In another aspect, the present invention provides a polymer produced based on 91% to 93% by weight of acrylonitrile and 7% to 9% by weight of triallyl isocyanurate as monomer and crosslinker respectively, wherein the parts by weight of acrylonitrile and triallyl isocyanurate sum to at least 98% by weight based on the total amount of the employed monomers and crosslinkers.

DETAILED DESCRIPTION

The polymer may have been produced from further monomers and/or crosslinkers. Preferably employed monomers in the context of the present invention include acrylic acid esters having branched or unbranched $C_1$-$C_6$-alkyl radicals, styrene, methylstyrene, ethylstyrene, chlorostyrene or vinylpyridine.

Monomers in the context of the invention also include multiethylenically ethylenically unsaturated monomers also known as crosslinkers. These crosslinkers are preferably compounds from the series butadiene, isoprene, divinylbenzene, divinyltoluene, trivinylbenzene, divinylnaphtalene, trivinylnaphtalene, divinylcyclohexane, trivinylcyclohexane, trially cyanurate, triallylamine, 1,7-octadiene, 1,5-hexadiene, cyclopentadiene, norbornadiene, diethylene glycol divinyl ether, triethylene glycol divinyl ether, tetraethylene glycol divinyl ether, butanediol divinyl ether, ethylene glycol divinyl ether, ethylene glycol dimethacrylate, trimethylolpropane trimethacrylate, allyl methacrylate, cyclohexanedimethanol divinyl ether, hexanediol divinyl ether or trimethylolpropane trivinyl ether.

It is preferable when no further monomers and/or crosslinkers are employed. It is preferable when monomers and/or crosslinkers that may be present in addition to acrylonitrile and triallyl isocyanurate derive from impurities from the employed acrylonitrile and/or triallyl isocyanurate. Additional monomers and/or crosslinkers other than acrylonitrile and triallyl isocyanurate may be used to produce the polymer in a weight fraction 2% by weight, particularly preferably in a weight fraction ≤1% by weight.

The polymers preferably have a gel-like structure. If they have a gel-like structure this is to be understood as meaning that they have a BET surface area <25 $m^2$/g.

The polymers preferably have a diameter in the range from 100 µm to 2000 µm.

The invention likewise comprises the polymer produced based on 80% to 95% by weight of acrylonitrile as monomer and 5% to 20% by weight of triallyl isocyanurate as crosslinker, wherein the parts by weight of acrylonitrile and triallyl isocyanurate sum to at least 98% by weight based on the total amount of employed monomers and crosslinkers.

It is particularly preferable when the parts by weight of acrylonitrile and triallyl isocyanurate sum preferably to at least 99% by weight, very particularly preferably 100% by weight, based on the total amount of employed monomers and crosslinkers. The cation exchanger is produced by hydrolysis of the polymer, preferably according to step b.) of the production process described below.

The cation exchanger preferably has a gel-like structure. If the cation exchanger has a gel-like structure, this is to be understood as meaning that it has a BET surface area <25 $m^2$/g.

For the avoidance of doubt it is noted that the scope of the invention encompasses all hereinbelow-listed definitions and parameters referred to in general terms or within preferred ranges in any desired combinations.

The invention likewise comprises a process for producing the cation exchanger, wherein in a step a.)
80% to 95% by weight of acrylonitrile as monomer and 5% to 20% by weight of triallyl isocyanurate as crosslinker, wherein the parts by weight of acrylonitrile and triallyl isocyanurate sum to at least 98% by weight based on the total amount of the employed monomers and crosslinkers,
are polymerized in the presence of water in the presence of at least one initiator,
optionally in the presence of at least one protective colloid,
and in a step b.) the polymer from step a.) is hydrolysed to afford the cation exchanger in the presence of at least one base or at least one acid.

It is preferable to employ acrylonitrile in an amount of 91% to 93% by weight and triallyl isocyanurate in an amount of 7% to 9% by weight, wherein the parts by weight of acrylonitrile and triallyl isocyanurate sum to at least 98% by weight based on the total amount of the employed monomers and crosslinkers.

The polymer from step a.) may have been produced from further monomers and/or crosslinkers. Preferably employed monomers in the context of the present invention include acrylic acid esters having branched or unbranched $C_1$-$C_6$-alkyl radicals, styrene, methylstyrene, ethylstyrene, chlorostyrene or vinylpyridine.

Monomers in the context of the invention also include multiethylenically ethylenically unsaturated monomers also known as crosslinkers. These crosslinkers are preferably compounds from the series butadiene, isoprene, divinylbenzene, divinyltoluene, trivinylbenzene, divinylnaphthalene, trivinylnaphthalene, divinylcyclohexane, trivinylcyclohexane, trially cyanurate, triallylamine, 1,7-octadiene, 1,5-hexadiene, cyclopentadiene, norbornadiene, diethylene glycol divinyl ether, triethylene glycol divinyl ether, tetraethylene glycol divinyl ether, butanediol divinyl ether, ethylene glycol divinyl ether, ethylene glycol dimethacrylate, trimethylolpropane trimethacrylate, allyl methacrylate, cyclohexanedimethanol divinyl ether, hexanediol divinyl ether or trimethylolpropane trivinyl ether. It is preferable when no further monomers and/or crosslinkers are employed.

It is preferable when monomers and/or crosslinkers that may be present in addition to acrylonitrile and triallyl isocyanurate derive from impurities from the employed acrylonitrile and/or triallyl isocyanurate. Additional monomers and/or crosslinkers other than acrylonitrile and triallyl isocyanurate may be used to produce the polymer from step a.) in a weight fraction ≤2% by weight, particularly preferably in a weight fraction ≤1% by weight.

Acrylonitrile and triallyl isocyanurate and optionally further crosslinkers and/or monomers form an organic phase. This phase is typically mixed by stirring with the aqueous phase and then forms monomer droplets. However, the formation of the monomer droplets could also be effected for example by ultrasound treatment. It is preferable when the monomer mixture is stirred to achieve droplet formation.

It is preferable when the weight ratio of acrylonitrile and triallyl isocyanurate to the aqueous phase is 0.5:1 to 1:1.

The organic phase contains at least one initiator or mixtures of initiators to induce polymerization. Initiators preferably employable for the process according to the invention are peroxy compounds, particularly preferably peroxy compounds from the series dibenzoyl peroxide, dilauroyl peroxide, bis(p-chlorobenzoyl) peroxide, dicyclohexyl peroxydicarbonate, tert-butyl peroctoate, tert-butyl peroxy-2-ethylhexanoate, 2,5-bis(2-ethylhexanoylperoxy)-2,5-dimethylhexane or tert-amylperoxy-2-ethylhexane, and also azo compounds, preferably 2,2'-azobis(isobutyronitrile) or 2,2'-azobis(2-methylisobutyronitrile) or mixtures thereof. It is very particularly preferable to employ dibenzoyl peroxide as initiator.

The initiators are preferably employed in amounts of 0.05% to 2.5% by weight, particularly preferably 0.1% to 1.5% by weight, based on the employed amount of acrylonitrile.

The polymers produced in step a.) preferably have a gel-like structure. If they have a gel-like structure this is to be understood as meaning that they have a BET surface area <25 m²/g.

It is also possible for the polymers produced in step a.) to have a macroporous structure. To produce the macroporous structure it is necessary to employ at least one porogen. Suitable porogens include organic solvents that are poor solvents and/or swellants for the polymer formed. Preferably employable porogens include compounds from the series hexane, octane, isooctane, isododecane, toluene, methyl ethyl ketone, dichloroethane, dichloropropane, butanol or octanol and isomers thereof. It is also possible to employ mixtures of porogens. It is preferable not to employ an organic solvent in step a.). It is particularly preferable when no toluene, in particular no porogens, are employed in step a.). It is preferable when no organic solvents are employed in step a.).

To produce a macroporous structure the porogen/porogen mixture is preferably employed in amounts of 5% to 70% by weight, particularly preferably 10% to 50% by weight, based on the sum of all monomers.

The polymers obtainable from step a) are preferably spherical in shape and are also referred to as bead polymers.

It is preferable when the aqueous phase in step a.) is a mixture of at least 60% by weight of water and the optionally employable polymerization inhibitor, protective colloids, buffer compounds, such as preferably phosphate buffer and employed salts. The amount of water is based on the total amount of water and the optionally employable polymerization inhibitor, protective colloids, buffer compounds, such as preferably phosphate buffer and the employed salts.

In a preferred embodiment in the production of the polymers according to step a) the aqueous phase may comprise at least one dissolved polymerization inhibitor. Suitable polymerization inhibitors in the context of the present invention preferably include both inorganic and organic substances. Particularly preferred inorganic polymerization inhibitors include nitrogen compounds from the series hydroxylamine, hydrazine, sodium nitrite or potassium nitrite, salts of phosphorous acid, in particular sodium hydrogen phosphite, and sulfur-containing compounds, in particular sodium dithionite, sodium thiosulfate, sodium sulfate, sodium hydrogen sulfite, sodium rhodanide or ammonium rhodanide. Particularly preferred organic polymerization inhibitors include phenolic compounds from the series hydroquinone, hydroquinone monomethyl ether, resorcinol, catechol, tert-butylcatechol, pyrogallol and condensation products of phenols with aldehydes. Suitable organic polymerization inhibitors further include nitrogen-containing compounds. These include hydroxylamine derivatives preferably from the series N,N-diethylhydroxylamine, N-isopropylhydroxylamine and also sulfonated or carboxylated N-alkylhydroxylamine or N,N-dialkylhydroxylamine derivatives, hydrazine derivatives, preferably N,N-hydrazinodiacetic acid, nitroso compounds, preferably N-nitrosophenylhydroxylamine, N-nitrosophenylhydroxylamine ammonium salt or N-nitrosophenylhydroxylamine aluminium salt. If a polymerization inhibitor is employed the concentration of the polymerization inhibitor to be employed is 5 to 1000 ppm based on the aqueous phase, preferably 10 to 500 ppm, particularly preferably 10 to 250 ppm. It is preferable to use no polymerization inhibitor.

In a preferred embodiment the polymerization of the monomer droplets in step a.) is performed in the aqueous phase in the presence of one or more protective colloids. Suitable protective colloids include natural or synthetic water-soluble polymers from the series gelatine, starch, polyvinyl alcohol, polyvinylpyrrolidone, polyacrylic acid, polymethacrylic acid or copolymers of acrylic acid or acrylic acid esters. Gelatine is preferred according to the invention. Likewise also preferred according to the invention are cellulose derivatives, in particular cellulose esters or cellulose ethers, very particularly preferably carboxymethylcellulose, methylhydroxyethylcellulose, methylhydroxypropylcellulose or hydroxyethylcellulose.

The protective colloids may be employed individually or as mixtures of different protective colloids.

Preferable protective colloids further include condensation products of aromatic sulfonic acids and formaldehyde. It is very particularly preferable to employ naphthalenesulfonic acid-formaldehyde condensate and/or the Na salt thereof (preferably according to CAS No. 91078-68-1) as protective colloids. Such products are marketed inter alia by LANXESS Deutschland GmbH under the name Baykanol®. Yet more preferably employed as protective colloids are naphthalenesulfonic acid-fonnaldehyde condensate as the Na salt (preferably according to CAS No. 91078-68-1) and hydroxyethylcellulose.

The usage amount for the sum of the protective colloids is preferably 0.05% to 1% by weight based on the aqueous phase, particularly preferably 0.05% to 0.5% by weight.

The use of protective colloids has the effect that the monomer droplets are encapsulated. The average particle size of the optionally encapsulated monomer droplets is 10 to 1000 min, preferably 100 to 1000 μm.

In a preferred embodiment the polymerization in step a) may also be performed in the presence of a buffer system. It is preferable to employ buffer systems which preferably at commencement of polymerization maintain the aqueous phase at a pH between 6 and 14, yet more preferably between 8 and 10. Adjustment is preferably effected by addition of a base. Preferably employed bases include alkali metal hydroxides or ammonia. It is particularly preferable to employ sodium hydroxide, preferably in aqueous solution. The pH range is then preferably stabilized using buffer systems. Under these conditions, protective colloids having carboxylic acid groups are wholly or partly present as salts. This has a favourable effect on the action of the protective colloids. Particularly suitable buffer systems contain phosphate or borate salts. The terms "phosphate" and "borate" in the context of the invention also include the condensation products of the ortho forms of corresponding acids and salts. The concentration of the phosphate/borate in the aqueous phase is 0.5 to 500 mmol/l, preferably 2.5 to 100 mmol/l.

In a further preferred embodiment the polymerization in step a) may also be carried out in the aqueous phase in the presence of a salt. This reduces the solubility of the organic compounds in the water. Preferred salts are halides, sulfates or phosphates of the alkali metals and alkaline earth metals. They may be employed in a concentration range up to saturation of the aqueous phase. The optimal range is therefore different for each salt and must be tested.

Sodium chloride is particularly preferred. The preferred concentration range of the employed salts is preferably 10% to 25% by weight based on the aqueous phase.

The stirrer speed during polymerization has a substantial effect on particle size especially at the start of the polymerization. In principle smaller particles are obtained at higher stirrer speeds. By adapting the stirrer speed a person skilled in the art can steer the particle size of the bead polymers into the desired range. Various stirrer types may be employed. Particularly suitable stirrers are axial-action gate stirrers. In a 4 L laboratory glass reactor stirrer speeds of 100 to 400 rpm (revolutions per minute) are typically employed.

The polymerization temperature depends on the decomposition temperature of the employed initiator. It is preferably between 50° C. to 180° C., particularly preferably between 55° C. and 130° C. The polymerization preferably takes from 0.5 to several hours, particularly preferably 2 to 20 hours, very particularly preferably 5 to 15 hours. It has proven advantageous to employ a temperature program where the polymerization is commenced at low temperature, for example from 50° C., and the reaction temperature is raised with increasing polymerization conversion. Heating to 55° C. to 75° C. and stirring at this temperature range for 2 to 8 h is particularly preferred. This is particularly preferably followed by heating to a range of 85° C. to 98° C. and polymerizing for a further 1 to 4 hours. This makes it possible for example to very efficiently fulfil the requirement for reliable progress of the reaction and a high polymerization conversion. In a preferred embodiment polymerization is followed by isolation of the polymer by customary methods, preferably by filtering, decanting or centrifugation, and optionally washing.

In a preferred embodiment of the invention initially the salt and the protective colloids or the mixtures of the protective colloids are mixed with the buffer. The organic phase, preferably containing acrylonitrile, triallyl isocyanurate and the initiator or the initiator mixture, is then added. The batch is then stirred for preferably between 15 min and 1 hour. The batch is then heated to preferably a temperature of 55° C. to 75° C. preferably over 1 to 2 hours. In this temperature range the reaction is performed for preferably 3 to 6 hours. The mixture is then heated to 85° C. to 98° C. preferably over 30 min to 1.5 hours. The temperature is preferably maintained for 1 to 3 hours. The polymer from step a.) may then be washed and subjected to workup and purification by methods known to those skilled in the art.

The crosslinked polymers based on acrylonitrile and triallyl isocyanurate produced according to step a) are in step b) hydrolysed by reaction with a base or an acid.

Step b.) (Hydrolysis)

Preferably employed bases are aqueous, alcoholic or aqueous alcoholic solutions of alkali metal and alkaline earth metal hydroxides. It is preferable to employ aqueous alkali metal solutions, such as aqueous potassium hydroxide solution and in particular aqueous sodium hydroxide solution. The concentration of the alkali metal solution to be employed is 10% to 60% by weight, preferably 20% to 35% by weight.

The amount of alkali metal solution is chosen such that an alkali excess of 10 to 500 mol %, preferably 100 to 300 mol %, based on the amount of the nitrile groups to be hydrolysed is established.

For the purposes of reliable and reproducible reaction management it is advantageous to add one of the reaction components, the polymer from step a.) or the base, in the form of a metered addition over a longer period at a temperature $T1$. The addition may preferably be carried out over 1 to 15 h, particularly preferably over 2 to 10 h.

In a preferred embodiment of the present invention the base is metered into a stirred aqueous suspension of the polymer from step a.) in a pressure reactor at a temperature $T1$. The metered addition of the base may be carried out at a constant rate. However it has proven particularly advantageous to increase the metered addition rate during the addition. This makes it possible to achieve a very uniform reaction and heat evolution at high productivity.

The temperature $T1$ is preferably 70° C. to 120° C., particularly preferably 80° C. to 105° C.

For completion of the hydrolysis the temperature of the reaction mixture is preferably increased to a temperature $T2$. $T2$ is preferably 100° C. to 180° C. and particularly preferably 120° C. to 160° C. The temperature increase from $T1$ to $T2$ is preferably carried out once addition of the base is complete.

$T2$ is preferably 20° C. to 110° C., particularly preferably 30° C. to 70° C., higher than $T1$.

After the hydrolysis the cation exchangers from step b.) are in the salt form and may optionally be charge-reversed and optionally further purified.

Step b.) (Acid Hydrolysis)

The polymer from step a.) is preferably hydrolysed by reaction with at least one acid. The acids employed are preferably inorganic acids, such as preferably sulfuric acid, hydrochloric acid, nitric acid or hydrofluoric acid. The use of sulfuric acid is particularly preferred. The acids are preferably employed in a molar ratio of 0.5:1 to 5:1, particularly preferably 1:1 to 3:1, based on the molar amount of nitrile groups in the polymer. The polymer is preferably admixed with 50% to 300% by weight of water based on the mass of employed polymer. A temperature $T1$ of 80° C. to 130° C. is then preferably established. The addition of the acids is preferably carried out during heating to the temperature $T1$. The mixture is then preferably heated to a temperature $T2$ of 120° C. to 170° C. The hydrolysis is preferably carried out at a pressure of not more than 5 bar. The reaction time is preferably in a range from 2 to 20 hours, particularly preferably from 3 to 16 hours.

In a preferred embodiment of the invention in step b.) the polymer from step a.) is initially admixed with water. The reaction is preferably performed in an autoclave. This is followed by heating to the temperature $T1$. A portion of the acid, preferably 30% to 80% based on the total amount of the acid, is preferably added, preferably in the form of a metered addition, during the heating phase to the temperature $T1$. The addition of the acid is preferably carried out over 1 to 2 hours. The remaining portion of the acid is then added, preferably over 1 to 5 hours. This is preferably followed by heating to the temperature $T2$. The mixture is preferably stirred for a further 0.5 to 6 hours.

After the hydrolysis the polymers from step b.) are in the H form and may optionally be further purified. The polymers from step b.) are cation exchangers.

Step b) is preferably carried out by acid hydrolysis.

Purification is preferably carried out with strong acids. Sulfuric acid having a concentration of preferably 1% to 50% by weight, particularly preferably of 1% to 20% by weight, is suitable. For further purification the cation exchangers may be treated with water/steam at elevated temperature. Finely divided constituents may subsequently be removed in a classifying column.

Applications

The cation exchangers according to the invention are preferably used for drinking water processing. They are particularly suitable for decationization and/or softening of drinking water, for example in household filters, and for decarbonization of drinking water and liquids which are used as foodstuffs or in the production of foodstuffs. Further important applications are decationization and/or softening of sugar solutions and solutions of organic products, preferably of beet sugar, cane sugar and starch sugar, of glycerol and/or gelatine, the deionization of water in the production of ultrahigh purity water, the decarbonization of raw water (in a countercurrent process), in an integrated system with a highly acidic cation exchanger for deionization of waters for industrial steam generation, as a buffer filter downstream of deionization plants for binding alkali metal ions, in the neutralization of regeneration wastewaters from deionization plants, in the sodium form for binding heavy metals, such as preferably copper, nickel or zinc, from solutions at a pH >5 in the absence of calcium ions and complex formers.

In particular the cation exchangers according to the invention may be used for
- decationization and/or softening of aqueous or organic solutions
- decationization and/or softening of process streams in the chemical industry
- removal of heavy metal and/or noble metal ions from aqueous solutions.

Heavy metals or noble metals in the context of the present invention are elements of the periodic table having atomic numbers 22 to 30, 42 to 50 and 74 to 83.

The cation exchangers according to the invention may further be used for purification of wastewater streams. A further application of the cation exchangers according to the invention is the purification of leachate water from landfills.

The cation exchangers according to the invention are preferably used for purification of water. This makes it possible to obtain drinking water featuring a particularly inconspicuous smell, if any, and high taste. In addition, the ammonia content in the polymer from step b.) is markedly reduced during production, thus reducing contamination of wastewater and the environment. The process according to the invention is moreover capable of producing the polymer from step b.) in high yield. This reduces the production costs. The process according to the invention moreover markedly reduces adhesions and encrustations of polymer in the reactor during production, thus resulting in cost savings and a reduction in generated waste.

Methods

Determination of Amount of Weakly Acidic Groups According to DIN 54403

50 ml of the exchanger are shaken down in a tamping volumeter and subsequently washed into a glass column with demineralized water. 600 mL of aqueous sodium hydroxide solution c(NaOH) 1 mol/L are then applied. The column is then washed out with 200 mL of DM water. All outflows are combined in a 1000 mL volumetric flask, made up to the mark with DM water and thoroughly mixed. 50 mL of this solution are diluted to about 100 mL with mixed bed water and titrated with HCl c(HCl)=1 mol/L using a Metrohm Titrino apparatus.

The amount of weakly acidic groups is calculated by the formula

TK, H-form=20×(0.6−20×ml HCl/1000) eq/L.

Nitrogen Adsorption

The nitrogen adsorption measurements were carried out in liquid nitrogen in a Quantachrome Quadrosorb SI instrument. Prior to measurement the samples (starting weight about 100 mg) were heated under vacuum at 2 K/min to a target temperature (bead polymer 120° C., functionalized bead polymer 50° C.) and degassed at this temperature for 12 hours. Calculation of specific surface area was done using the BET method (software: QuadrWin).

Ammonium in Eluate 100 mL of the ion exchanger, measured in a 100 mL measuring cylinder, are transferred into the filter column while avoiding air bubbles. 1000 mL of calcium chloride solution are passed through the column and the eluate collected in a 1 L measuring cylinder. The eluate is then thoroughly mixed and the pH determined. The ammonium content in the eluate is measured according to the LCK 304 cuvette instructions (cuvette test—ammonium, 0.015-2.0 mg/L $NH_4$—N). The LCK 304 cuvette is first heated to room temperature and 5 mL of the eluate are then pipetted thereinto using an Eppendorf pipette. After at least 15 min waiting time the value may be measured and (in mg/L) read off.

EXAMPLES

Example 1

1.1 Preparation of a Crosslinked Polymer

Aqueous Phase

| | |
|---|---|
| 215 g | NaCl in |
| 624 ml | Water |
| 3.91 g | Disodium hydrogen phosphate × 12 $H_2O$ |
| 0.160 g | NaOH (10%) |
| 1.4 g | Hydroxyethylcellulose |
| 143 ml | Water |
| 3.4 g | Na salt of naphthalenesulfonic acid formaldehyde condensate (95%/balance water) (CAS No. 91078-68-1) in |
| 94 ml | Water |

Organic Phase

| | |
|---|---|
| 735 g | Acrylonitrile (purity > 98%) |
| 65 g | Triallyl isocyanurate (purity > 98%) |
| 3.2 g | Dibenzoyl peroxide |

In a polymerization vessel the sodium chloride solution (215 g NaCl in 624 ml water) is initially charged with disodium hydrogen phosphate (3.91 g), the hydroxyethylcellulose (1.4 g) is added and the pH adjusted to pH 8.5 with dil. aqueous sodium hydroxide solution (0.16 g NaOH (10%)). The sulfonic acid solution (Na salt of naphthalenesulfonic acid formaldehyde condensate (95%) (CAS No. 91078-68-1) in 94 ml of water) is stirred for 15 min and then added to the polymerization vessel. The complete aqueous phase is stirred for a further 30 minutes.

The organic phase is stirred at room temperature for 15 min and then added to the aqueous phase and stirred at 160 rpm (revolutions per minute) at room temperature for 20 min.

The mixture is heated to 64° C. over 90 min with stirring. The total reaction time at 64° C. is 4 h 40 min. The mixture is subsequently heated to 90° C. over 1 h and held at this temperature for 2 h. Unconverted acrylonitrile is then removed by reduction with 30% aqueous sodium hydrogen sulfite solution. The resin is then washed out with DM water on a 100 μm sieve.

Yield: 1280 ml of polymer, polymerization conversion: 95.4%.

Effective particle size (diameter) (DIN 54407 particle size distribution DE vers. 04/2015): 332 μm, DM water stands for demineralized water.

1.2 Preparation of the Cation Exchanger

The polymer produced according to 1.1 (850 mL) is initially charged in an autoclave with 850 mL of DM water and heated to 120° C. over 50 min. Simultaneously with the heating 736 g of 96% by weight sulfuric acid (65% of altogether 1.3 equivalents of $H_2SO_4$ based on 8.74 mol of nitrile groups in the polymer (calculation based on amount of acrylonitrile in the polymer)) are uniformly metered in with stirring. Immediately thereafter 396 g of sulfuric acid are added at 120° C. over 250 min. The mixture is stirred at 120° C. for a further 90 min once addition is complete. The mixture is subsequently heated to 150° C. over 90 min and then stirred for a further 2 h at 150° C. The reaction mixture is cooled to room temperature and the autoclave is then decompressed. The resulting pressure is not more than 5 bar.

The polymer is removed, transferred into a glass frit column with DM water and dewatered. The polymer is then washed with DM water. This is followed by washing with 15% by weight of sulfuric acid. A further wash with DM water is then performed. The polymer is then classified with DM water for washing and removal of fines.

Yield: 1530 mL of cation exchanger
Analytical:

| TK H-Form [mol/l] | 4.7 |
| Smell (DIN 10955: 2004-06) | 0.5 |
| Taste (DIN 10955: 2004-06) | 0 |
| Ammonium in eluate (mg/l) | 0.219 |

A value of 0 is the best category in the assessment of the taste and smell of the purified water. Higher values are worse.

2. Comparative Test (Noninventive) Using a Crosslinker Mixture of Triallyl Isocyanurate and Divinylbenzene 2.1 Preparation of a Crosslinked Polymer Aqueous Phase

| 215 g | NaCl in |
| 624 ml | Water |
| 3.91 g | Disodium hydrogen phosphate × 12 $H_2O$ |
| 0.160 g | NaOH (10%) |
| 1.4 g | Hydroxyethylcellulose |
| 143 ml | Water |
| 3.4 g | Na salt of naphthalenesulfonic acid formaldehyde condensate (95%/balance water) (CAS No. 91078-68-1) in |
| 94 ml | Water |

O Phase

| 731 g | Acrylonitrile |
| 49 g | Triallyl isocyanurate |
| 20 g | Divinylbenzene, 80% (contains 20% ethylvinylbenzene) |
| 3.2 g | Dibenzoyl peroxide |

In a polymerization vessel the sodium chloride solution (215 g NaCl in 624 ml water) is initially charged with disodium hydrogen phosphate (3.91 g), the hydroxyethylcellulose (1.4 g) is added and the pH adjusted to pH 8.5 with dil. aqueous sodium hydroxide solution (0.16 g NaOH (10%)). The sulfonic acid solution (Na salt of naphthalenesulfonic acid formaldehyde condensate (95%) (CAS No. 91078-68-1) in 94 ml of water) is stirred for 15 min and then added to the polymerization vessel. The complete aqueous phase is stirred for a further 30 minutes.

The organic phase is stirred at room temperature for 15 min and then added to the aqueous phase and stirred at 160 rpm (revolutions per minute) at room temperature for 20 min.

The mixture is heated to 64° C. over 90 min with stirring. The total reaction time at 64° C. is 4 h 40 min. The mixture is subsequently heated to 90° C. over 1 h and held at this temperature for 2 h. The batch is then cooled and admixed with 350 g of a 30% by weight sodium hydrogen sulfite solution. Any remaining acrylonitrile residual monomer is destroyed over 4 h by stirring at 80° C. The polymer is then washed out with DM water on a 100 µm sieve. The polymer is subjected to vibration on a vibration table for volume determination.

Yield: 1225 ml of polymer, polymerization conversion: 92%.

Effective particle size (diameter) (DIN 54407 particle size distribution DE vers. 04/2015): 283 µm.

2.2 Preparation of the Cation Exchanger

The polymer produced according to 2. 1 (700 mL) is initially charged in an autoclave with 720 mL of DM water and heated to 120° C. over 50 min. Simultaneously with the heating 622 g of 96% by weight sulfuric acid (65% of altogether 1.3 equivalents of $H_2SO_4$ based on about 7.26 mol of nitrile groups in the polymer (calculation based on amount of acrylonitrile in the polymer)) are uniformly metered in with stirring. Immediately thereafter 342 g of sulfuric acid are added at 120° C. over 250 min. The mixture is stirred at 120° C. for a further 90 min once addition is complete. The mixture is subsequently heated to 150° C. over 90 min and then stirred for a further 2 h at 150° C. The reaction mixture is cooled to room temperature and the autoclave is then decompressed. The resulting pressure is not more than 5 bar.

The polymer is removed, transferred into a glass frit column with DM water and dewatered. The polymer is then washed with DM water. This is followed by washing with 15% by weight of sulfuric acid. A further wash with DM water is then performed. The polymer is then classified with DM water for washing and removal of fines.

Yield: 1360 ml of polymer
Analytical:

| TK H-Form [mol/l] | 4.7 |
| Smell (DIN 10955: 2004-06) | 2 |
| Taste (DIN 10955: 2004-06) | 2 |
| Ammonium in eluate (mg/l) | 0.667 |

Result from Example 1 and the Comparative Example

The crosslinker mixtures known from the prior art comprising triallyl isocyanurate and divinylbenzene thus result in conjunction with the monomer acrylonitrile in a cation exchanger which cannot adequately purify water since it continues to have a compromised taste and smell (see comparative example with values of 2 which are poorer than in the inventive example 1). By contrast, the cation exchangers according to the invention result in a purified water with improved taste and smell and further exhibit a lower ammonium proportion during production. The wastewater thus experiences less contamination.

What is claimed is:

1. A cation exchanger produced by hydrolysis of a polymer produced based on 80% to 95% by weight of acrylonitrile as monomer and 5% to 20% by weight of triallyl isocyanurate as crosslinker, wherein the parts by weight of acrylonitrile and triallyl isocyanurate sum to at least 98% by weight based on the total amount of employed monomers and crosslinkers.

2. The cation exchanger according to claim 1, wherein 91% to 93% by weight of acrylonitrile and 7% to 9% by weight of triallyl isocyanurate are employed, wherein the parts by weight of acrylonitrile and triallyl isocyanurate sum to at least 98% by weight based on the total amount of employed monomers and crosslinkers.

3. The cation exchanger according to claim 1, wherein the parts by weight of acrylonitrile and triallyl isocyanurate sum to at least 99% by weight based on the total amount of the employed monomers and crosslinkers.

4. The cation exchanger according to claim 1, wherein the cation exchanger has a gel-like structure and has a BET surface area <25 $m^2/g$.

5. A process for producing a cation exchanger, comprising the steps:
   polymerizing, in the presence of water and at least one initiator, 80% to 95% by weight of acrylonitrile as monomer and 5% to 20% by weight of triallyl isocyanurate as crosslinker, wherein the parts by weight of acrylonitrile and triallyl isocyanurate sum to at least 98% by weight based on the total amount of the employed monomers and crosslinkers,
   optionally in the presence of at least one protective colloid,
   thereby forming a polymer and
   hydrolyzing the polymer to afford the cation exchanger in the presence of at least one base or at least one acid.

6. The process for producing the cation exchanger according to claim 5, wherein the at least one initiator is selected from peroxy compounds, dibenzoyl peroxide, dilauroyl peroxide, bis(p-chlorobenzoyl) peroxide, dicyclohexyl peroxydicarbonate, tert-butyl peroctoate, tert-butyl peroxy-2-ethylhexanoate, 2,5-bis(2-ethylhexanoylperoxy)-2,5-dimethylhexane, tert-amylperoxy-2-ethylhexane, azo compounds, 2,2'-azobis(isobutyronitrile), and 2,2'-azobis(2-methylisobutyronitrile).

7. The process for producing the cation exchanger according to claim 5, wherein the protective colloid is employed and is selected from gelatine, starch, polyvinyl alcohol, polyvinylpyrrolidone, polyacrylic acid, polymethacrylic acid and copolymers of (meth)acrylic acid and (meth)acrylic acid esters, cellulose derivatives, cellulose, esters, cellulose ethers, carboxymethylcellulose, methylhydroxyethylcellulose, methylhydroxypropylcellulose, hydroxyethylcellulose, naphthalenesulfonic acid-formaldehyde condensate and the Na salt thereof.

8. The process for producing the cation exchanger according to claim 7, wherein the protective colloid is naphthalenedisulfonic acid-formaldehyde condensate and/or the Na salt thereof.

9. The process for producing the cation exchanger according to claim 5, wherein the pH of the aqueous phase is adjusted to 8 to 10 by addition of a base.

10. The process for producing the cation exchanger according to claim 9, wherein the weight ratio of acrylonitrile and triallyl isocyanurate to the aqueous phase is 0.5 to 1.0.

11. The process for producing the cation exchanger according to claim 5, wherein an acid hydrolysis is performed by addition of sulfuric acid.

12. The process for producing the cation exchanger according claim 11, wherein acids are employed in a molar ratio of 0.5:1 to 5:1 based on the molar amount of nitrile groups in the polymer.

13. A process for decationization and/or softening of aqueous or organic solutions, for decationization and/or softening of process streams in the chemical industry and for removal of heavy metal and/or noble metal ions from aqueous solutions, comprising contacting the cation exchanger produced according to claim 5 with the aqueous or organic solutions and/or the process streams in the chemical industry to be treated.

14. A polymer produced based on 91% to 93% by weight of acrylonitrile as monomer and 7% to 9% by weight of triallyl isocyanurate as crosslinker, wherein the parts by weight of the acrylonitrile and the triallyl isocyanurate sum to at least 98% by weight based on total amount of the employed monomers and crosslinkers.

* * * * *